US 6,644,668 B1

(12) United States Patent
Albers et al.

(10) Patent No.: US 6,644,668 B1
(45) Date of Patent: Nov. 11, 2003

(54) BRUSH SEAL SUPPORT

(75) Inventors: Robert J. Albers, Park Hills, KY (US);
Randall C. Bauer, Loveland, OH (US);
John C. Brauer, Lawrenceburg, IN
(US); Scott Joseph Schmid,
Montgomery, OH (US); **Kenneth M.
Lewis**, Middletown, OH (US)

(73) Assignee: General Electric Company,
Schenectady, NY (US)

( * ) Notice: Subject to any disclaimer, the term of this patent is extended or adjusted under 35 U.S.C. 154(b) by 0 days.

(21) Appl. No.: 10/170,163

(22) Filed: Jun. 13, 2002

(51) Int. Cl.[7] .................................................. F16J 15/44
(52) U.S. Cl. ....................................................... 277/355
(58) Field of Search ........................ 277/355; 415/173.5, 415/174.5, 174.1

(56) References Cited

U.S. PATENT DOCUMENTS

| | | | | |
|---|---|---|---|---|
| 5,066,025 A | * | 11/1991 | Hanrahan | 277/355 |
| 5,090,710 A | * | 2/1992 | Flower | 277/355 |
| 5,480,165 A | * | 1/1996 | Flower | 277/355 |
| 5,522,698 A | | 6/1996 | Butler et al. | 415/170.1 |
| 5,568,931 A | | 10/1996 | Tseng et al. | 277/53 |
| 5,597,167 A | | 1/1997 | Snyder et al. | 277/53 |
| 5,630,590 A | * | 5/1997 | Bouchard et al. | 277/301 |
| 5,704,760 A | * | 1/1998 | Bouchard et al. | 415/170.1 |
| 5,961,279 A | * | 10/1999 | Ingistov | 415/170.1 |
| 6,012,723 A | * | 1/2000 | Beeck | 277/355 |
| 6,032,959 A | | 3/2000 | Carter | 277/355 |
| 6,045,134 A | * | 4/2000 | Turnquist et al. | 277/347 |
| 6,079,945 A | | 6/2000 | Wolfe et al. | 415/231 |
| 6,139,019 A | | 10/2000 | Dinc et al. | 277/355 |
| 6,161,836 A | * | 12/2000 | Zhou | 277/355 |
| 6,168,162 B1 | | 1/2001 | Reluzco et al. | 277/355 |
| 6,206,629 B1 | | 3/2001 | Reluzco et al. | 415/1 |
| 6,226,975 B1 | | 5/2001 | Ingistov | 60/39.02 |
| 6,250,640 B1 | | 6/2001 | Wolfe et al. | 277/355 |
| 6,308,958 B1 | | 10/2001 | Turnquist et al. | 277/355 |
| 6,331,006 B1 | | 12/2001 | Baily et al. | 277/355 |
| 6,402,157 B1 | * | 6/2002 | Zhou et al. | 277/355 |
| 6,471,213 B1 | * | 10/2002 | Yuri et al. | 277/355 |
| 6,505,834 B1 | * | 1/2003 | Dinc et al. | 277/355 |
| 2002/0020968 A1 | * | 2/2002 | Gail et al. | 277/355 |

FOREIGN PATENT DOCUMENTS

GB 2191825 A * 12/1987 ............ F16J/15/16

* cited by examiner

Primary Examiner—Chuck Y. Mah
Assistant Examiner—Vishal Patel
(74) Attorney, Agent, or Firm—Nathan D. Herkamp; Alfred J. Mangels

(57) ABSTRACT

A support arrangement for a brush seal positioned between a stationary and a rotatable component of a turbomachine. The brush seal has a downstream backing plate that includes an axially-extending lip adjacent its radially outermost end to minimize axial deflection of the seal as a result of a gas pressure differential acting across the seal.

12 Claims, 3 Drawing Sheets

BRUSH SEAL SUPPORT

BACKGROUND OF THE INVENTION

1. Field of the Invention

The present invention relates to seals for turbomachinery, and more particularly to a brush seal positioned between a rotating component and a stationary component of a turbomachine for minimizing the flow of a gas between the components.

2. Description of the Related Art

Seals between stationary and rotating parts of machinery are known in various forms. Some seals are provided for blocking the flow of a liquid or a viscous material, such as a lubricant, while other seals are directed to blocking gas flow between the stationary and rotating components.

In turbomachinery, seals are provided for preventing excessive gas flow between stationary and rotating components in order to minimize gas leakage and thereby improve the operating efficiency of the turbomachine. Among the different types of seals employed in turbomachines are labyrinth seals, O-ring seals, and brush seals, as well as others. In that regard, brush seals are often utilized in compressors and turbines of gas turbine engines and in steam turbines of power generating plants to minimize leakage gas flow between stationary and rotating components. The brush seals confine the gases within predetermined regions, such as the primary flow path for air and combustion products in a gas turbine engine, as well as cooling airflow paths within a gas turbine engine.

Brush seals generally include a plurality of metallic bristles that extend in a substantially radial direction relative to an axis of rotation. The bristles are clamped between a pair of annular backing plates that are interconnected at their radially outermost ends. The seal is stationary, with the outer ends of the bristles usually extending outwardly from between the backing plates and in a radially inward direction, toward the axis of rotation, to contact an annular surface of a rotating component, such as a compressor rotor or a turbine rotor.

Because of the sometimes relatively large gas pressure differentials that exist across brush seals, some form of support is provided at the lower pressure side of the brush seal in order to minimize pressure-induced deflection of the bristles. In that regard, bristle deflection in an axial direction of the turbomachine tends to increase the gap between the bristle ends and the rotating component, thereby reducing the effectiveness of the seal by allowing gas to flow around the inner ends of the bristles. Bristle support is usually provided on the downstream side of the seal by a radially-elongated backing plate or a separate, radially-extending surface that is parallel to and is placed against the bristles on the downstream side. In land-based or stationary turbomachines, such as steam turbines or stationary gas turbine engines, where weight is not a major consideration, sufficient rigid supporting structure can readily be provided around the portions of a brush seal to prevent axial deflection of the seal itself, as well as of the bristles. However, in applications where weight of the turbomachine is a very important consideration, such as in aircraft gas turbine engines, the heavy, rigid supporting structure that is available in land-based turbomachines is not suitable.

The present invention is directed to providing a brush seal supporting arrangement in which axial deflection of the brush seal is minimized while simultaneously minimizing the weight of the seal supporting structure.

SUMMARY OF THE INVENTION

Briefly stated, in accordance with one aspect of the present invention, there is provided a brush seal support structure for a brush seal that is positioned between a stationary turbomachine component and a rotatable turbomachine component. The purpose of the brush seal is to minimize gas flow between the components.

The structure includes an annular brush seal that has an annular upstream backing plate and an annular downstream backing plate spaced from each other and substantially parallel to each other, and a plurality of bristles that are positioned between the backing plates. The bristles are disposed substantially parallel to each other and extend outwardly from between the backing plates at an inner radial end of the brush seal toward a land surface defined by a rotating component. The backing plates are joined by a bridging member at an outer radially end of the brush seal. The downstream backing plate includes an axially-outwardly-extending lip to define an annular end face that is spaced in a downstream direction from the bristles.

A non-rotatable brush seal support is provided that includes a substantially axially-disposed brush seal contact surface that is spaced radially outwardly from the land surface. The support structure includes a radially-inwardly-facing annular groove adjacent to the annular end face of the lip. A retaining ring is carried in the annular groove and has a substantially radially-extending surface for engagement with the end face of the downstream backing plate lip.

DESCRIPTION OF THE PREFERRED EMBODIMENTS

Figure 1:
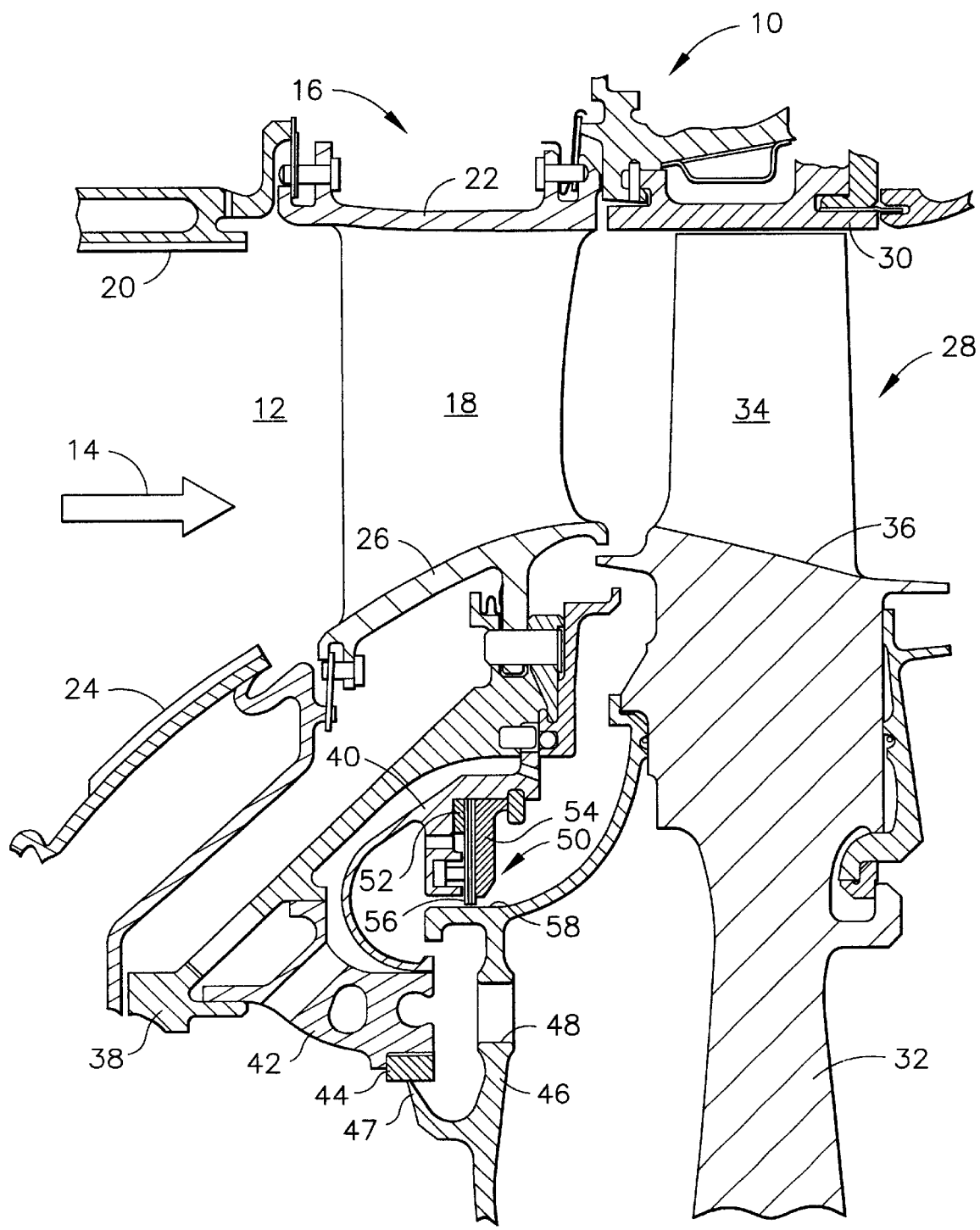
FIG. 1 is a fragmentary, axial cross-sectional view of a portion of a turbomachine that incorporates an embodiment of a brush seal support arrangement.

Referring to the drawings, and particularly to FIG. 1 thereof, there is shown a single stage of an axial-flow turbine 10 of an aircraft gas turbine engine. An annular gas flow path 12 extends in the direction indicated by arrow 14 from an annular combustion section (not shown) from which hot combustion products flow toward a turbine stator section 16 that includes a plurality of radially-extending, circumferentially-spaced stator vanes 18, only one of which is visible in FIG. 1. The outer annular surface of gas flow path 12 is defined by a combustor outer casing 20 that is aligned with and connected with a stator section outer ring 22. The inner annular surface of gas flow path 12 is defined by a combustor inner casing 24 that is aligned with and connected with a stator section inner ring 26. Stator vanes 18 are secured to each of stator outer ring 22 and stator inner ring 26 to form the turbine nozzle that directs the combustion products at a predetermined angle relative to a turbine rotor section 28 that together with turbine stator section 16 defines the single stage of turbine 10. As will be appreciated by those skilled in the art, the turbine can also be a multi-stage turbine, if desired.

Turbine rotor section 28 includes a stationary, annular outer shroud 30 that surrounds a rotatable turbine rotor disk 32 that carries a plurality of radially-extending, circumferentially-spaced rotor blades 34, only one of which is visible in FIG. 1. The radially-inwardly-facing annular surface of shroud 30 is substantially aligned with the radially-inwardly-facing annular surface of stator outer ring 22 to define the outer annular surface of flow path 12 through turbine 10. The inner annular surface of flow path 12 through turbine 10 is defined by the radially-outwardly-facing surface of stator inner ring 26 and the radially-outwardly-facing surfaces of the platforms 36 of rotor blades 34.

Positioned inwardly of combustor inner casing 24 and stator inner ring 26 is a stator support ring 38 that is connected with a stationary inner structural support member (not shown). Support ring 38 is also connected with stator inner ring 26 and carries a stationary, brush seal support ring 40. Support ring 38 carries an abradable-seal support ring 42, to which is secured an annular, abradable, static seal element 44, such as a honeycomb ring. Rotor disk 32 carries a turbine rotor sealing ring 46 that includes an annular seal tooth 47 for engagement with abradable seal element 44 to define a seal therebetween. Rotor sealing ring 46 includes a plurality of circularly-disposed, axially-extending cooling air openings 48 that admit lower temperature cooling air from the compressor (not shown) to cool turbine rotor disk 32 and to flow to and through cooling air passageways (not shown) provided within rotor blades 34.

Brush seal support ring 40 is an annular member that carries an annular brush seal 50 that includes an upstream backing plate 52 and a downstream backing plate 54. A plurality of side-by-side metallic bristles 56 are carried between backing plates 52 and 54 and extend in a generally radial direction. The radially innermost ends of bristles 56 of brush seal 50 are positioned opposite to a substantially axially-extending land surface 58 carried by turbine rotor sealing ring 46, to minimize gas flow around brush seal 50.

Figure 2:
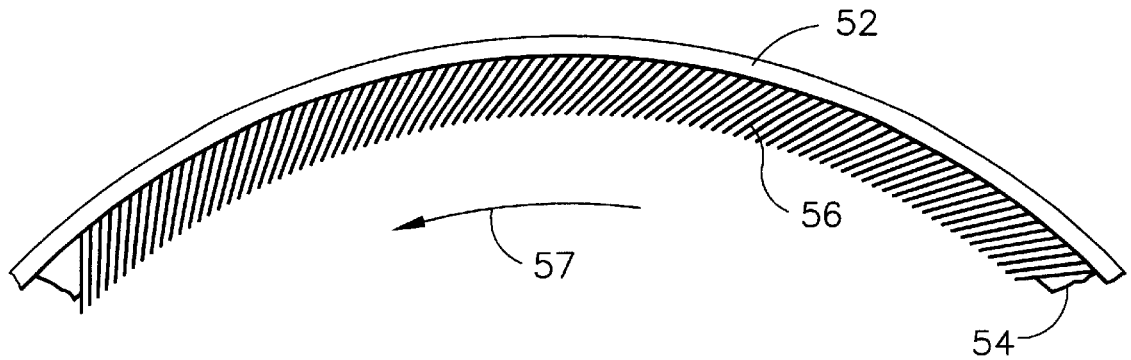
FIG. 2 is a fragmentary front elevational view of an embodiment of an annular brush seal of the type shown in FIG. 1.

The basic structure of brush seal 50 is shown in an axial view in FIG. 2, which is a view in the downstream direction of FIG. 1. As shown, the brush seal includes upstream backing plate 52, downstream backing plate 54, and bristles 56 that are carried between backing plates 52 and 54. The bristles lie in an axial plane of the turbomachine and are inclined relative to a tangent to the annular brush seal, the bristle inclination extending at an acute angle in the direction of rotation indicated by arrow 57 in FIG. 2. The angle of inclination of the bristles can be of the order of about 45° or so.

Figure 3:
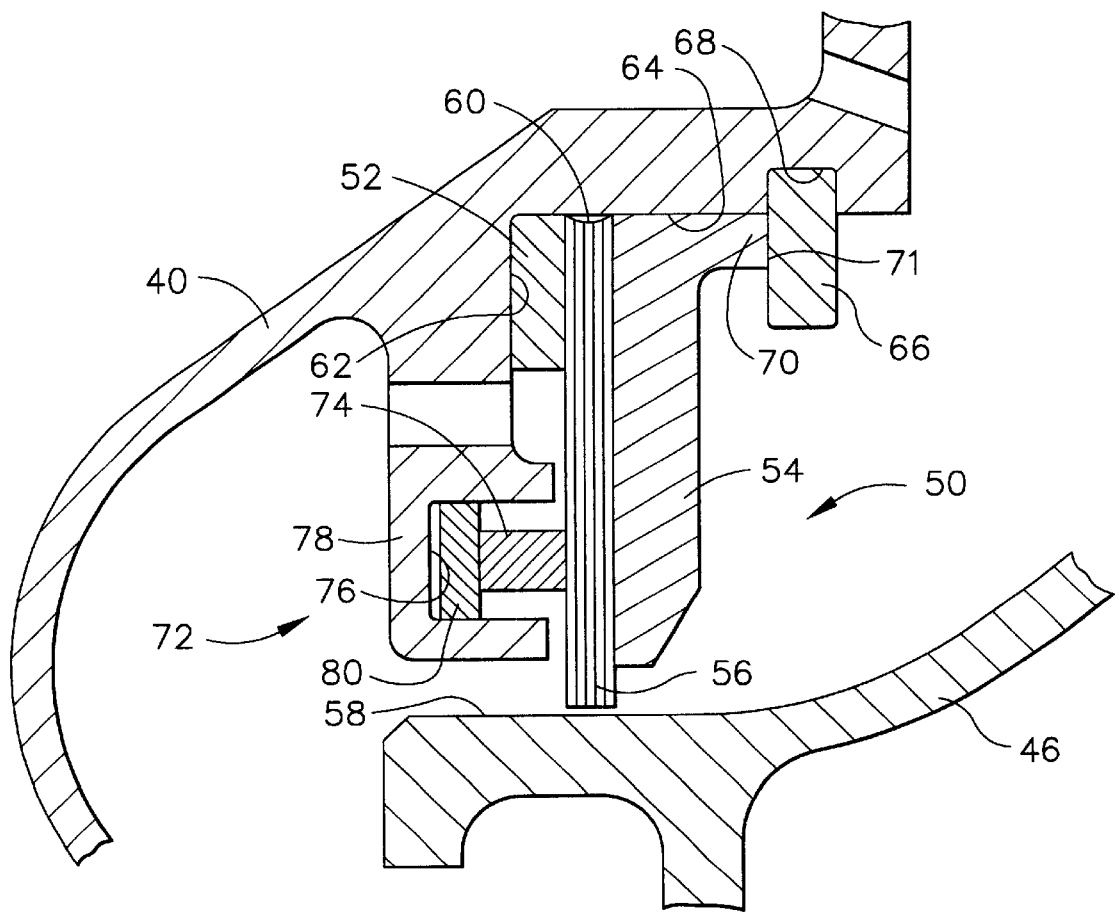
FIG. 3 is an enlarged, fragmentary, axial cross-sectional view of the brush seal support arrangement shown in FIG. 1.

The structure of brush seal 50 and its retention in brush seal support ring 38 are shown in enlarged form in FIG. 3. As shown, upstream and downstream backing plates 52, 54 are joined by a bridging member 60, which commonly is in the form of a weld bead that also engages the radially outermost ends of the bristles to form the assembled brush seal. Brush seal support ring 40 includes a radially-extending forward bearing surface 62 against which the outer, radially-extending face of upstream backing plate 52 rests. The radially outermost end surfaces of backing plates 52, 54 and of bridging member 60 engage an annular, axially-directed contact surface 64. Consequently, brush seal 50 is restrained against radial outward movement by contact surface 64. Brush seal 50 is also restrained against axial movement in the upstream direction, opposite to the direction indicated by arrow 14 in FIG. 1, by forward bearing surface 62. Axial movement of brush seal 50 in a downstream direction is prevented by an annular retaining ring 66 that is received in a radially-extending annular groove 68 formed in brush seal support ring 40.

As shown in FIG. 3, the radially outermost end faces of upstream backing plate 52 and downstream backing plate 54 are aligned. Those end faces each have the same outer diameter and they bear against axially-extending contact surface 64 of brush seal support ring 40. However, upstream backing plate 52 has a shorter radial length dimension than does downstream backing plate 54. In that regard, downstream backing plate 54 is longer because the gas pressure differential that acts on bristles 56 of brush seal 50, as a result of the gas pressures that exist on the respective axial faces of seal 50, acts in a direction from upstream backing plate 52 toward downstream backing plate 54. Accordingly, the longer radial length of downstream backing plate 54 serves to provide support against rearward, or downstream, deflection of the bristles. Such deflection, if permitted to occur, would cause the radially innermost ends of the bristles to be deflected rearwardly and upwardly, away from land surface 58, thereby enlarging the potential leakage flow area and allowing undesired leakage of gas around the brush seal.

Downstream backing plate 54 is sometimes configured as a thick, rigid element, to minimize deflection caused by the gas pressure differential upstream and downstream of the seal. Alternatively, a heavier, more substantial downstream supporting structure is sometimes provided against which the downstream backing plate rests, to minimize its axial deflection. In that regard, the axially-directed force acting on the brush seal can be quite substantial, and a pressure differential across the brush seal of the order of about 250 psi or more is possible. However, in aircraft gas turbine engine applications, where component weight is a very important consideration, it is desirable to minimize as much as possible the axial thickness of the downstream backing plate and the downstream supporting structure in order to reduce the overall weight of the brush seal structure. But such a thickness reduction can lead to a tendency of the downstream backing plate also to deflect in a rearward axial direction, along with the bristles, particularly when the pressure differential across the brush seal is substantial. Such deflection results in pivotal movement of the downstream backing plate about a pivot point that is at the rearmost outer radial edge surface of the downstream backing plate.

In order to minimize deflection of the downstream backing plate, the brush seal embodiment shown in FIG. 3 includes an aft annular lip 70 that extends in a generally axial, downstream direction from the downstream backing plate, and at a point adjacent to its radially outermost surface. The effect of providing such an annular lip is to increase the structural rigidity of downstream backing plate 54, by providing backing plate 54 as an L-shaped element in cross section, thereby reducing its tendency for axial deflection. The lip serves to shift the backing plate pivot point in a rearward direction, further away from the bristles, and adjacent to retaining ring 66, which is spaced axially downstream of the radially-extending aft surface of downstream backing plate 54. Lip 70 has a radially-extending outer end surface 71 that contacts retaining ring 66, to prevent brush seal 50 from moving axially in a rearward direction, while also minimizing rearward deflection.

Also shown in FIG. 3 is a bristle vibration damper 72 that is positioned on the upstream side of the brush seal opposite bristles 56, to limit forward or upstream axial movement of the bristles in a direction away from downstream backing plate 54. Such movements can occur during pressure pulsations, or from excitation by the rotor, which can cause vibrations in or a fluttering motion of bristles 56. Vibration damper 72 can be in the form of an annular ring 74, which is received in an annular slot 76 in a damper support ring 78 that extends in a radially inward direction from brush seal support ring 40. A suitable biasing member 80 can be provided within slot 76 to bear against and urge damper ring 78 against the upstream surfaces of bristles 56 to maintain the bristles in a substantially radial orientation. Biasing member 80 can be in the form of a sinusoidal or wave-type spring that is received in slot 76, and serves to urge damper ring 78 against the upstream bristle surfaces to substantially clamp the bristles between damper ring 78 and downstream backing plate 54.

As is apparent from the structure shown in FIG. 3, brush seal 50 is restrained against outward radial movement by contact surface 64 of support ring 40. Additionally, the seal is supported against forward axial movement by forward bearing surface 62 of brush seal support ring 40, and it is confined against rearward axial movement by retaining ring 66. However, there is no structure that confines brush seal 50 against movement in a radially inward manner, which significantly minimizes the overall weight of brush seal 50 and its supporting structure.

Figure 4:
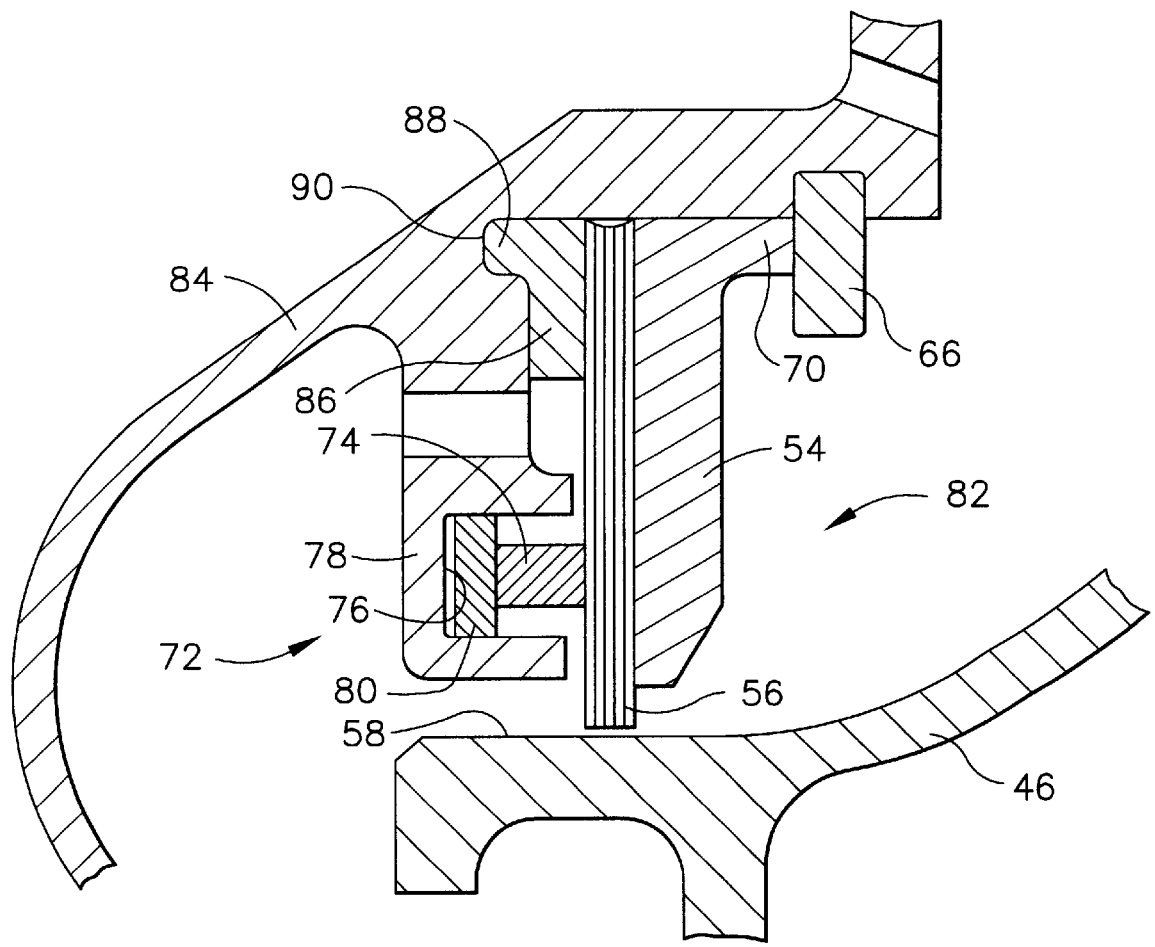
FIG. 4 is an enlarged, fragmentary, axial cross-sectional view of another embodiment of a brush seal support arrangement.

A modified form of brush seal 82 and of brush seal support ring 84 are shown in FIG. 4. The structures shown in FIG. 4 are similar to those shown in FIG. 3, except that upstream backing plate 86 includes a forwardly-extending annular lip 88 adjacent to the radially outermost surface of the upstream backing plate. Lip 88 adds rigidity to upstream backing plate 86 in the same manner as lip 70 adds rigidity to downstream backing plate 54. In the FIG. 4 embodiment brush seal support ring 84 includes an axially-extending annular recess 90 to receive lip 88, to thereby combine with the structure that is common to the FIGS. 3 and 4 embodiments to confine brush seal 82 against both radial and forward axial movement relative to brush seal support ring 84. Additionally, lip 88 and annular recess 90 also serve to prevent pivotal rearward movement of upstream backing plate 86.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the invention.

What is claimed is:

1. A brush seal support structure for a brush seal positioned between a stationary turbomachine component and a rotatable turbomachine component for minimizing gas flow between the components, said support structure comprising:
    a. an annular brush seal including an annular upstream backing plate and an annular downstream backing plate spaced from and substantially parallel to the upstream backing plate, a plurality of bristles positioned between the upstream and downstream backing plates, wherein the bristles are disposed substantially parallel to each other and extend outwardly from between the backing plates at an inner radial end of the brush seal toward a land surface defined on a rotating component, and wherein the backing plates are joined by a bridging member at an outer radial end of the brush seal, the downstream backing plate including an axially-outwardly-extending lip to define an annular end face spaced in a downstream direction from the bristles;
    b. a non-rotatable brush seal support including a substantially axially-disposed brush seal contact surface spaced radially outwardly from the land surface for receiving the outer radial end of the brush seal, the brush seal contact surface including a recess having a radially-inwardly-facing opening adjacent to the annular end face of the lip; and
    c. a retaining member carried in the recess, the retaining member having a substantially radially-extending surface for engagement with the end face of the downstream backing plate lip.

2. A brush seal support structure in accordance with claim 1, wherein the lip is adjacent an outer radial end of the brush seal.

3. A brush seal support structure in accordance with claim 1, wherein the bristles are substantially equally inclined relative to a tangent to the brush seal periphery.

4. A brush seal support structure in accordance with claim 1, wherein the backing plates have substantially the same outer radius and have different radial lengths.

5. A brush seal support structure in accordance with claim 1, wherein each backing plate includes a substantially axially-outwardly-extending lip.

6. A brush seal support structure for a brush seal positioned between a stationary turbomachine component and a rotatable turbomachine component for minimizing gas flow between the components, said support structure comprising:
    a. an annular brush seal including an annular upstream backing plate and an annular downstream backing plate spaced from and substantially parallel to the Upstream backing late, a plurality of bristles positioned between the upstream and downstream backing plates, wherein the bristles are disposed substantially parallel to each other and extend outwardly from between the backing plates at an inner radial end of the brush seal toward a land surface defined on a rotating component, and wherein the backing plates are joined by a bridging member at an outer radial end of the brush seal and each backing plate includes a substantially axially-outwardly-extending lit, wherein each lip is positioned at the radially outermost end of the respective backing plate, the downstream backing plate lip including an annular end face spaced in a downstream direction from the bristles;
    b. a non-rotatable brush seal support including a substantially axially-disposed brush seal contact surface spaced radially outwardly from the land surface, the support structure including a radially-inwardly-facing annular groove adjacent to the annular end face of the lip; and
    c. a retaining ring carried in the annular groove, the retaining ring having a substantially radially-extending surface for engagement with the end face of the downstream backing plate lip.

7. A brush seal support structure in accordance With claim 1, wherein the downstream backing plate has a greater axial thickness than the upstream backing plate.

8. A brush seal support structure in accordance with claim 1, including a bristle vibration damper positioned on the upstream side of the brush seal opposite the bristles to limit axial movement of the bristles in a direction away from the downstream backing plate.

9. A brush seal support structure in accordance with claim 1, wherein the seal is pivotable about a pivot point in response to a pressure differential between the upstream side and the downstream side of the seal, and wherein the pivot point is spaced axially outwardly of the downstream backing plate.

10. A brush seal support structure in accordance with claim 1, wherein the lip is unrestrained in a radially-inward direction.

11. A brush seal support structure in accordance with claim 1, wherein the retaining member is a retaining ring.

12. A brush seal support structure in accordance with claim 1, wherein the retaining member reduces pivotal movement of the brush seal relative to the brush seal support.

* * * * *